Oct. 11, 1966 R. J. DOCKERY 3,277,915
FLUID LOGIC ELEMENT
Filed April 16, 1964
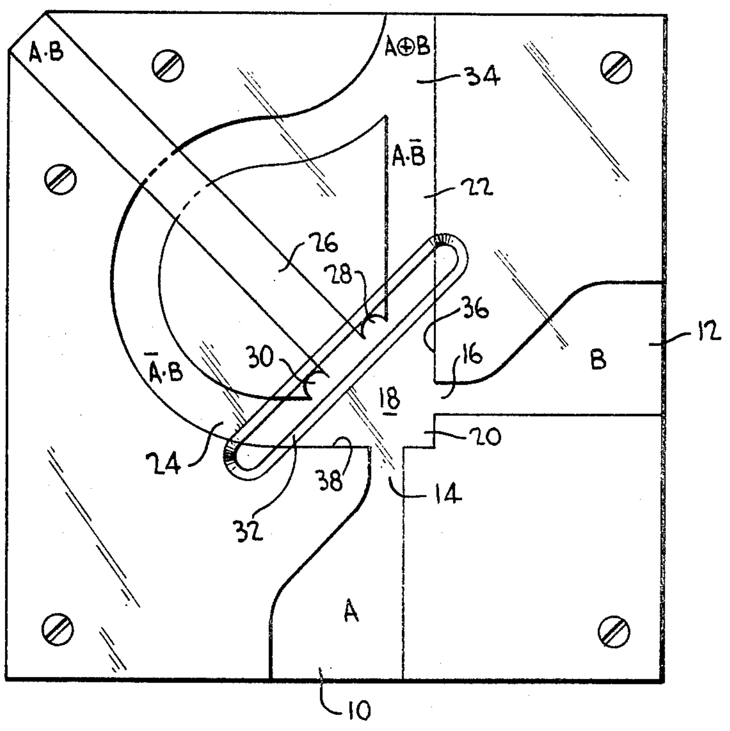
INVENTOR,
ROBERT J. DOCKERY
BY: Harry M. Saragovitz,
Edward J. Kelly,
Herbert Berl &
J. P. Edgerton

United States Patent Office 3,277,915

Patented Oct. 11, 1966

3,277,915

FLUID LOGIC ELEMENT

Robert J. Dockery, Silver Spring, Md., assignor to the United States of America as represented by the Secretary of the Army Filed Apr. 16, 1964, Ser. No. 360,460
8 Claims. (Cl. 137—81.5)

The invention described herein may be manufactured and used by or for the Government of the United States of America for governmental purposes without the payment to me of any royalty thereon.

This invention relates generally to fluid systems and more particularly to an improved pure fluid logic element for performing the logical functions AND and Exclusive OR.

In the fields of computation, automation and control the use of logic elements to perform mathematical and decisional operations has become increasingly important. Most commonly these elements take the form of relay or electronic circuits which are expensive, vulnerable to radiation, and require conversion systems when used to control or monitor physical conditions. With the advent of the pure fluid amplifier having no moving part, a new control element having none of the disadvantages of the relay and electronic circuits has been made available to the industry. A great deal of research and development has been directed toward pure fluid systems employing the basic fundamentals of the pure fluid amplifier. This effort has resulted in a number of pure fluid logic elements which while operable have not been altogether satisfactory. These elements depend for operability on the critical adjustment of the input fluid streams. In most practical applications it is impractical and sometimes impossible to maintain the critical adjustment required by these units. Additionally, the prior art pure fluid logic elements have not provided clean switching and thereby low noise signal outputs nor have they been operable when the output fluid streams are loaded or operated against a significant back pressure.

Perhaps the most important logical functions or operations are the AND function and the Exclusive OR function. These two functions describe the basic addition operation performed by the well-known half-adder. Virtually all mathematical operations may be performed or approximated by these two operations.

It is therefore an object of the invention to provide a pure fluid logic element which performs the logical AND function on two input fluid streams which while having the discrete conditions of "on" or "off" may assume a wide range of "on" conditions without adversely effecting the operation of the element.

It is another object of this invention to provide a pure fluid logic element which switches cleanly between outputs thereby providing low noise output signals and which operates well when the output fluid streams are loaded or operated against a significant back pressure.

It is a further object of the instant invention to provide a pure fluid logic element which performs the logical AND function and the logical Exclusive OR function on two input fluid streams which flow under widely varying pressures.

According to the present invention, the foregoing and other objects are attained by providing in a fluid device two nozzles positioned perpendicular to each other and offset each from the other, three receiving passages two of which have axes parallel to but offset from the axes of the respective nozzles and the third of which is positioned angularly equidistant between the first two, two vortex-creating devices in the form of cusps positioned between the first and the third receiving passages and between the second and the third receiving passages, respectively, and an aperture providing a communication path between the area of interaction of fluid streams issued by the two nozzles and a fluid volume under ambient pressure.

The specific nature of the invention, as well as other objects, aspects, uses and advantages thereof, will clearly appear from the following description and from the accompanying drawing in which the sole figure shows a plan view of the fluid logic element according to the invention.

Referring now to the drawing the logic element is shown as being the planar type and may, for example, be constructed with a series of laminates to define the various passages, chambers, and nozzles. Two input fluid signals which may be designated A and B in accordance with the usual Boolean mode of expression are connected to input passages 10 and 12, respectively. These two passages constrict to form nozzles 14 and 16. The nozzles are positioned to issue two fluid streams perpendicular to each other in the interaction chamber 18 and are offset each from the other thereby defining a notch 20. Receiving passage 22 emanates from chamber 18 and is positioned opposite the nozzle 14. The passage 22 has an axis which is parallel to the axis of nozzle 14 but offset therefrom toward nozzle 16. A second receiving passage 24 emanates from chamber 18 and is positioned opposite the nozzle 16. The passage 24 has an axis which is parallel to the axis of nozzle 16 but offset therefrom toward nozzle 14.

Receiving passage 26 emanates from chamber 18 and is positioned angularly equidistant between the passages 22 and 24. Located between passages 22 and 26 and passages 24 and 26 in the interaction chamber 18 are vortex-creating devices in the form of cusps 28 and 30, respectively, in the form of cusps. An aperture 32 perpendicular to the plane of the element provides a path between the interaction chamber 18 and the outside environment. The passages 22 and 24 come together in a smooth junction and form an output passage 34 leading away from chamber 18.

In operation, a fluid stream entering by way of input passage 10 is projected as a high velocity fluid stream across the interaction chamber 18 toward the receiving passage 22 by nozzle 14. In the absence of a fluid stream issuing from nozzle 16, the fluid stream issuing from the nozzle 14 entrains the air along the wall 36 creating a low pressure area along the wall. As a result the fluid stream locks on to the wall 36. This is the well-known Coanda effect. The cusp 28 produces a high pressure area which further tends to urge the stream against wall 36. The fluid stream flowing in receiving passage 22 is expressed in Boolean symbology as $A \cdot \overline{B}$ which simply means that a flow exists when there is a fluid stream in input passage 10 and not in input passage 12. A fluid stream entering by way of input passage 12 is projected as a high velocity fluid stream across the interaction chamber 18 toward the receiving passage 24 by nozzle 16. In the absence of a stream issuing from the nozzle 14, this fluid stream locks on to wall 38 due to the low pressure area created along the wall and the high pressure area created by the diffuser 30. The fluid stream flowing in passage 24 is expressed as $\overline{A} \cdot B$. When fluid streams are issuing simultaneously from nozzles 14 and 16, they interact deflecting each other toward receiving passage 26. Under this condition the cusps 28 and 30 create high pressure areas on either side of the resultant fluid stream thereby insuring the exclusive flow in receiving passage 26 and promoting clean switching between either of the receiving passages 22 or 24 and receiving passage 26. The notch 20 creates another pressure area which enhances the interaction of the two fluid streams. The offsets of the receiving passages 22 and 24 toward adjacent nozzles 16 and 14, respectively, permit fluid streams in input passages 12 and 10, respectively, under widely varying pressures to effectively cause the switching of fluid flow between receiving passages 24 or 22, respectively, and receiving passage 26. Thus, assuming there exists a relatively high power fluid stream, i.e., flow under relatively high pressure, flowing from nozzle 14 across chamber 18 and into passage 22, a relatively low power fluid stream issuing from nozzle 16 would be effective to cause the total switching of fluid flow from passage 22 to passage 26. The cusp 28 serves to enhance the switching between the passages and promote the exclusive flow in one or the other passages. The flow in passage 26 is expressed as $A\cdot B$ which is known as the AND function When any one of the fluid streams flowing in the receiving passages is loaded or operated against a significant back pressure, the flow in that passage has a tendency to switch or partially switch to an adjacent passage which presents a lower resistance to the fluid flow. To overcome this tendency, the aperture 32 has been provided and serves to maintain a flow in the desired passage by relieving the back pressure. The Exclusive OR function is experssed as $A\oplus B$ which is equivalent to the expression $A\cdot\overline{B}+\overline{A}\cdot B$. The first term of the latter expression will be recognized as the expression previously used to describe the flow in receiving passage 22, and the second term, the expression used to describe the flow in receiving passage 24. The flow in passage 34 is therefore properly described by the Exclusive OR function. Thus, the logic element is seen to perform the logical operations of a half-adder.

It will be apparent that the embodiment shown is only exemplary and that various modifications can be made in construction and arrangement within the scope of the invention as defined in the appended claims.

I claim as my invention:

1. A fluid logic element comprising:

(a) an interaction chamber, (b) a first nozzle for issuing a first fluid stream into said interaction chamber, (c) a second nozzle for issuing a second fluid stream perpendicular to said first fluid stream into said interaction chamber, said first and said second nozzles being offset each from the other and thus having a notch (20) therebetween for creating a pressure area thereby enhancing the interaction of said first and said second fluid streams, (d) a first receiving passage emanating from said interaction chamber and positioned to receive said first fluid stream in the absence of said second fluid stream and having its axis parallel to the axis of said first nozzle but offset therefrom toward said second nozzle thereby increasing the effect of said second fluid stream on said first fluid stream, (e) a second receiving passage emanating from said interaction chamber and positioned to receive said second fluid stream in the absence of said first fluid stream and having its axis parallel to the axis of said second nozzle but offset therefrom toward said first nozzle thereby increasing the effect of said first fluid stream on said second fluid stream, and (f) a third receiving passage emanating from said interaction chamber and positioned angularly equidistant between said first and said second receiving passages to receive the resultant fluid stream when said first and said second fluid streams interact.

2. A fluid logic element in accordance with claim 1, wherein said first receiving passage and said second receiving passage come together in a smooth junction and form a common output passage (34).

3. A fluid logic element according to claim 2 comprising additionally a slot-like aperture venting said interaction chamber, and also the entrances of said first, second, and third receiving passages, to the ambient atmosphere.

4. A fluid logic element according to claim 1 comprising additionally a slot-like aperture venting said interaction chamber, and also the entrances of said first, second, and third receiving passages, to the ambient atmosphere.

5. A fluid logic element comprising:

(a) an interaction chamber, (b) a first nozzle for issuing a first fluid stream into said interaction chamber, (c) a second nozzle for issuing a second fluid stream perpendicular to said first fluid stream into said interaction chamber, said first and said second nozzles being offset each from the other for creating a first pressure area when said first and said second fluid stream are issuing simultaneously into said interaction chamber thereby enhancing the interaction of said first and said second fluid streams, (d) a first receiving passage emanating from said interaction chamber and positioned to receive said first fluid stream in the absence of said second fluid stream and having its axis parallel to the axis of said first nozzle but offset therefrom toward said second nozzle thereby increasing the effect of said second fluid stream on said first fluid stream, (e) a second receiving passage emanating from said interaction chamber and positioned to receive said second fluid stream in the absence of said first fluid stream and having its axis parallel to the axis of said second nozzle but offset therefrom toward said first nozzle thereby increasing the effect of said first fluid stream on said second fluid stream, (f) a third receiving passage emanating from said interaction chamber and positioned angularly equidistant between said first and said second receiving passages to receive the resultant fluid stream when said first and said second fluid streams interact, (g) a first vortex-creating device positioned at the junction of said first and said third receiving passages for creating a second pressure area when a fluid flow exists in either of said first or said third receiving passages thereby promoting the exclusive fluid flow in either of said first or said third receiving passages, and (h) a second vortex-creating device positioned at the junction of said second and said third receiving passages for creating a third pressure area when a fluid flow exists in either of said second or said third receiving passages thereby promoting the exclusive fluid flow in either of said second or said third receiving passages.

6. The fluid logic element according to claim 5 comprising additionally a slot-like aperture (32) venting said interaction chamber, and also the entrances of said first, second, and third receiving passages, to the ambient atmosphere.

7. A planar fluid logic element comprising:

(a) an interaction chamber, (b) a first nozzle for issuing a first fluid stream into said interaction chamber, (c) a second nozzle for issuing a second fluid stream perpendicular to said first fluid stream into said interaction chamber, said first and said second nozzles being offset each from the other for creating a first pressure area when said first and said second fluid streams are issuing simultaneously into said interaction chamber thereby enhancing the interaction of said first and said second fluid streams, (d) a first receiving passage emanating from said interaction chamber and positioned to receive said first fluid stream in the absence of said second fluid stream and having its axis parallel to the axis of said first nozzle but offset therefrom toward said second nozzle thereby increasing the effect of said second fluid stream on said first fluid stream, (e) a second receiving passage emanating from said interaction chamber and positioned to receive said second fluid stream in the absence of said first fluid stream and having its axis parallel to the axis of said second nozzle but offset therefrom toward said first nozzle, thereby increasing the effect of said first fluid stream on said second fluid stream, (f) a third receiving passage emanating from said interaction chamber and positioned angularly equidistant between said first and said second receiving passages to receive the resultant fluid stream when said first and said second fluid streams interact, (g) a first vortex-creating device positioned at the junction of said first and said third receiving passages for creating a second pressure area when a fluid flow exists in either of said first or said third receiving passages thereby promoting the exclusive fluid flow in either of said first or said third receiving passages, (h) a second vortex-creating device positioned at the junction of said second and said third receiving passages for creating a third pressure area when a fluid flow exists in either of said second or said third receiving passages thereby promoting the exclusive fluid flow in either of said second or said third receiving passages, and (i) an aperture positioned perpendicular to the plane of the logic element and connecting said interaction chamber to a fluid volume under ambient pressure thereby permitting the loading of fluid flowing in any of said first, second, and third receiving passages without substantially effecting the flow therein.

8. A fluid logic element according to claim 7 comprising additionally a slot-like aperture (32) venting said interaction chamber, and also the entrances of said first, second, and third receiving passages, to the ambient atmosphere.

References Cited by the Examiner

UNITED STATES PATENTS

| | | | |
|---|---|---|---|
| 2,910,830 | 11/1959 | White | 137—81.5 |
| 3,107,850 | 10/1963 | Warren et al. | 137—81.5 X |
| 3,128,040 | 4/1964 | Norwood | 137—81.5 X |
| 3,181,546 | 5/1965 | Boothe | 137—81.5 |
| 3,209,774 | 10/1965 | Manion | 137—81.5 |

OTHER REFERENCES

H.D.L. Report, TR 1114, Fluid Amplification, "Logic Elements," #9, E. V. Hobbs, Mar. 8, 1963, pp. 16 and 20.

"Fluid Logic Devices and Circuits," Mitchell et al., Fluid Power Internation, May 1963, pp. 168–171.

M. CARY NELSON, *Primary Examiner.*

S. SCOTT, *Assistant Examiner.*